US012055261B2

(12) United States Patent
Dai (10) Patent No.: US 12,055,261 B2
(45) Date of Patent: Aug. 6, 2024

(54) TELESCOPIC WATER PIPE

(71) Applicant: Zhejiang Helen Plastic Co., Ltd., Zhejiang (CN)

(72) Inventor: Songlin Dai, Zhejiang (CN)

(73) Assignee: ZHEJIANG HELEN PLASTIC CO., LTD., Taizhou (CN)

( * ) Notice: Subject to any disclaimer, the term of this patent is extended or adjusted under 35 U.S.C. 154(b) by 657 days.

(21) Appl. No.: 16/568,733

(22) Filed: Sep. 12, 2019

(65) Prior Publication Data
US 2021/0025537 A1    Jan. 28, 2021

(30) Foreign Application Priority Data

Jul. 26, 2019   (CN) .......................... 201910683744.0

(51) Int. Cl.
| | |
|---|---|
| *F16L 57/06* | (2006.01) |
| *F16L 11/08* | (2006.01) |
| *F16L 11/12* | (2006.01) |
| *F16L 27/12* | (2006.01) |

(52) U.S. Cl.
CPC ............. *F16L 57/06* (2013.01); *F16L 11/085* (2013.01); *F16L 11/12* (2013.01); *F16L 27/12* (2013.01)

(58) Field of Classification Search
CPC .......... F16L 11/085; F16L 11/02; F16L 11/04; F16L 11/08–088; F16L 27/12; F16L 27/125; F16L 57/06
See application file for complete search history.

(56) References Cited

U.S. PATENT DOCUMENTS

| | | | | |
|---|---|---|---|---|
| 4,009,734 A | * | 3/1977 | Sullivan ................. | B29C 53/12 138/125 |
| 5,607,736 A | * | 3/1997 | Williams ................. | D04C 1/12 428/36.9 |
| D642,245 S | * | 7/2011 | Mezzalira ................. | D23/266 |
| 8,057,877 B2 | * | 11/2011 | Mezzalira ................. | B32B 1/08 138/140 |

(Continued)

FOREIGN PATENT DOCUMENTS

| | | | |
|---|---|---|---|
| CN | 203052052 U | 7/2013 | |
| EP | 0527512 A1 * | 7/1992 | |
| FR | 2826092 A1 * | 12/2002 | ........... D04B 21/205 |

*Primary Examiner* — Zachary T Dragicevich
*Assistant Examiner* — Alexander T Rufrano
(74) *Attorney, Agent, or Firm* — INNOVATION CAPITAL LAW GROUP, LLP; Vic Lin (57) ABSTRACT

A telescopic water pipe includes an elastic inner pipe having a contraction length and an extension length under the pressure of the liquid passing therethrough; and a braided layer wrapped on an outer circumferential surface of the elastic inner pipe; wherein the elastic inner pipe and the braided layer form together a first telescopic pipe body, the first telescopic pipe body expanding and contracting with the expansion and contraction of the elastic inner pipe, its outer diameters being close to the outer diameters of the elastic inner pipe. Therefore, the braided layer can expand and contract synchronically with the elastic inner pipe without wearing out the elastic inner pipe, thereby prolonging the service life of the first telescopic pipe body. The amount of used braided layer is saved, and the obtained first telescopic pipe body has a small volume and an unrestricted length.

11 Claims, 11 Drawing Sheets

(56) References Cited

U.S. PATENT DOCUMENTS

| | | | | |
|---|---|---|---|---|
| 8,985,159 B2* | 3/2015 | Caneva | ............. | F16L 11/085 |
| | | | | 138/123 |
| 9,188,255 B2* | 11/2015 | Litchfield | ............. | D04B 1/16 |
| 9,844,921 B2* | 12/2017 | Ragner | ............. | F16L 11/12 |
| 10,359,130 B2* | 7/2019 | Mezzalira | ............. | F16L 11/085 |
| 10,927,983 B2* | 2/2021 | Mezzalira | ............. | F16L 11/12 |
| 10,981,349 B2* | 4/2021 | Cegalin | ............. | B32B 5/02 |
| 10,995,434 B2* | 5/2021 | Vigolo | ............. | D04B 15/32 |
| 11,034,109 B2* | 6/2021 | Caneva | ............. | B32B 7/05 |
| 11,181,212 B2* | 11/2021 | Hsieh | ............. | F16L 11/12 |
| 11,287,066 B2* | 3/2022 | Mezzalira | ............. | B29C 48/355 |
| 11,333,281 B1* | 5/2022 | Peterson | ............. | F01M 11/03 |
| 11,486,518 B2* | 11/2022 | Gubitosa | ............. | F16L 11/12 |
| 2009/0116907 A1* | 5/2009 | Gaya I Altirriba | ............. | A01G 25/06 |
| | | | | 156/320 |
| 2009/0205736 A1* | 8/2009 | Mezzalira | ............. | F16L 11/085 |
| | | | | 138/125 |
| 2011/0209791 A1* | 9/2011 | Mezzalira | ............. | D04B 9/44 |
| | | | | 66/190 |
| 2014/0057103 A1* | 2/2014 | Mozsgai | ............. | D04C 1/06 |
| | | | | 156/149 |
| 2015/0129042 A1* | 5/2015 | Ragner | ............. | F16L 11/118 |
| | | | | 138/109 |
| 2016/0245430 A1* | 8/2016 | Mezzalira | ............. | B32B 7/06 |
| 2018/0163901 A1* | 6/2018 | Gopalan | ............. | C08K 5/0025 |

\* cited by examiner

TELESCOPIC WATER PIPE

TECHNICAL FIELD

The invention relates to a water pipe, in particular to a telescopic water pipe.

BACKGROUND

Since the area of a garden is generally large, in order to reduce the work intensity of garden watering by gardeners, a telescopic water pipe (for example, an elastic latex water pipe) is generally used for garden watering. Further, in order to prevent the latex water pipe from being pierced by the sharp sandstone particles or plant thorns on the ground during use, the outer pipe is generally sleeved on the outer side of the latex water pipe. For example, the utility model patent of the patent publication No. CN203052052U discloses a retractable water pipe which is provided with a sheath on the elastic inner pipe to protect the elastic inner pipe from being pierced.

However, although the problem that the elastic inner pipe is pierced by the external force is solved by adding the sheath, when the sheath is added, the expansion and contraction characteristics of the telescopic water pipe is accompanied by the friction damage caused by the sheath and the elastic inner pipe during the expansion and contraction, which becomes an important factor affecting the life of the telescopic water pipe. In order to ensure the life of the telescopic water pipe, some solutions are currently considered in the art to overcome the friction damage between the sheath and the elastic inner pipe. The common solutions include the following three types:

1. A film layer is disposed between the elastic inner pipe and the sheath to reduce the friction damage to the elastic inner pipe by utilizing the property of a small friction coefficient of the film;
2. The thickness of the elastic inner pipe is increased, that is to say, the elastic inner pipe is configured as a plurality of layers;
3. The elastic inner pipe is improved from the preparation of materials, and a new elastic inner pipe with good wear-resistance is developed.

These solutions extend the life of the telescopic water pipe to a certain extent, but increase the production process and/or production cost of the telescopic water pipe and increase the volume or weight of the telescopic water pipe.

SUMMARY

In order to further improve the life of the telescopic water pipe, different attempts and researches are made in the art. However, limited by the development characteristics of the art, it is more difficult to find a solution that can further improve the life of the telescopic water pipe by breaking through the three improvement solutions mentioned in the background. In recent years, there has been no more progress in the art. In order to solve this problem, the inventor has been carrying out experiments and improvements in terms of these three improvement solutions, and has made good progress by increasing the life of the traditional telescopic water pipe in which the elastic inner pipe is externally sleeved with the sheath from 250 to 1,250 times. But when the industry was stuck with the inherent solutions and stagnated, the inventor inadvertently gained inspiration from other industries by visiting a large number of other industries, and came up with a new solution to improve the wear of the elastic inner pipe of the telescopic water pipe. From understanding the production process of other industries, the inventor noticed that the production process of various outer cloth cover layers has been automated and equipmentized, At present, in the telescopic water pipe industry, for the use of the outer cloth cover layers, the usual practice is to purchase the finished products and then perform manual sleeved installation. This not only brings the problem that the elastic inner pipe is worn by the sheath, but also the production efficiency is heavily dependent on labor, and the space for efficiency improvement is limited. Inspired by the automated and equipmentized production of the outer cloth cover layer, the inventor thought of directly using the equipment to combine the elastic inner pipe and the outer cloth cover layer to improve production efficiency. Through many attempts and repeated adjustments to the solution, the inventor finally realized the weaving of the sheath directly on the inner pipe. Through the test of the product, the inventor was pleasantly surprised to find that when the sheath was tightly wrapped on the inner pipe, there was no occurrence of the damage of the telescopic water pipe due to wear when its life was tested 5,000 times. Due to the tight wrapping, the friction between the sheath and the inner pipe has been reduced to almost negligible, completely solving the wear-prone defects of the inner pipe due to the sheathing. This invention and exciting test results have brought new breakthroughs in the industry, which will directly improve and change the status quo of low production efficiency, unsatisfactory life and still large volume of telescopic water pipes, leading the upgrading and replacement of products.

According to an aspect of the invention, a telescopic water pipe is provided, comprising: an elastic inner pipe for allowing a liquid to pass therethrough, the elastic inner pipe having a contraction length and an extension length under the action of the pressure of the liquid passing therethrough; and a braided layer wrapped on an outer circumferential surface of the elastic inner pipe; wherein the elastic inner pipe and the braided layer form together a first telescopic pipe body, the first telescopic pipe body expanding and contracting with the expansion and contraction of the elastic inner pipe, and its outer diameters at the contraction length and at the extension length being close to the outer diameters of the elastic inner pipe at the corresponding lengths. Since the braided layer is disposed on the outer side of the elastic inner pipe, the elastic inner pipe can be prevented from being pierced by sharp objects such as sandstone, branches, plant thorns, etc. during use. Moreover, since the braided layer is tightly wrapped on the elastic inner pipe, when the elastic inner pipe is switched between the contraction length and the expansion length under the action of pressure of the liquid therein, the braided layer does not move relative to the elastic inner pipe, but expands or contracts in synchronism with the elastic inner pipe. Therefore, the elastic inner pipe is not worn by the braided layer that moves relative to it, and the first telescopic pipe body has a longer service life. Further, since the braided layer is directly woven on the elastic inner pipe, the braided layer can be woven seamlessly on the outer circumferential surface of the elastic inner pipe, so that the braided layer does not form pleats on the outer circumference of the elastic inner pipe, and the amount of use of the braided layer is reduced. In addition, since the excess braided layer is not accumulated outside the elastic inner pipe, the first telescopic pipe body obtained has a small volume, a small occupied space, and a light weight. Moreover, since the braided layer is directly woven outside of the elastic inner pipe by knitting, the braided layer can be woven outside the elastic inner pipe of any length to obtain the first telescopic pipe body of unrestricted length.

In some embodiments, the braided layer is woven along the outer circumferential surface of the elastic inner pipe by means of braided wires, and is wrapped seamlessly on the outer circumferential surface of the elastic inner pipe. Since the braided layer is directly woven on the elastic inner pipe by means of the braided wires, the braided layer can be woven seamlessly on the outer circumferential surface of the elastic inner pipe, thereby saving the amount of use of the braided wires.

In some embodiments, the braided layer is woven around the outer circumferential surface of the elastic inner pipe by means of at least two braided wires, wherein the braided wires run in a wavy trajectory along an axial direction of the elastic inner pipe and form a first coil and a second coil at the upper and lower portions of the wavy trajectory, respectively; each second coil of each of the braided wires is nested outside the one of the adjacent two first coils on the other braided wire and inside the other thereof, respectively; each first coil of each of the braided wires is nested outside of one of the adjacent two second coils on the other braided wire and inside of the other thereof, respectively. Since each coil of each of the braided wires is nested outside of one of the adjacent two coils on the other braided wire and inside of the other thereof, respectively, when the first telescopic pipe body is stretched, relative sliding between the mutually nested coils can be performed to enable the braided layer to stretch. Further, when the first telescopic pipe body is stretched, the mutually nested coils do not detach from each other, and the braided layer still maintains a mesh-shaped tubular structure.

In some embodiments, the braided layer is woven around the outer circumferential surface of the elastic inner pipe by means of at least four braided wires, and the other braided wire nested with the current braided wire is a braided wire spaced therefrom. Thereby, the mesh formed by the braided wires between the mutually nested coils is denser, and the ability of the braided layer to protect the elastic inner pipe is improved.

In some embodiments, the two mutually nested braided wires are mutually nested on the side facing away from the elastic inner pipe of the braided wire located therebetween. Thereby, the mutually nested coils can be placed on the braided wire between the two braided wires to which the two coils belong, so that the effect of the protrusions formed by the mutually nested coils on the braided layer on the elastic inner pipe is reduced, the inner surface of the braided layer is maintained in a relatively flat state, and the friction between the braided layer and the elastic inner pipe is further reduced.

In some embodiments, the mutually nested coils of the two braided wires form protrusions on the outer circumference of the braided layer, the protrusions extending in the axial direction of the elastic inner pipe. When the two coils are nested with each other, the thickness of the portion of the mutually nested coils on the braided layer corresponds to the thickness of the four-layer braided wire, while the thickness of the portion of the braided layer between the mutually nested coils has only the thickness of the one-layer braided wire. Therefore, it is equivalent to forming the protrusions at the portion of the braided layer at which the mutually nested coils are located. The protrusions can on the one hand increase the distance in which the elastic inner pipe is in direct contact with the outside and reduce the probability of the elastic inner pipe being pierced by the outside, and on the other hand increase the service life of the braided layer, thereby improving the overall service life of the telescopic water pipe.

In some embodiments, the protrusions are formed in a serrated shape, and serrated tooth tips extend in a circumferential direction of the braided layer. Since the protrusions are formed by nesting mutually the two coils, when the elastic inner pipe is at the contraction length, the angle included between the serrated protrusions (the angle included between the two serrated tooth faces) has its minimum value. When the elastic inner pipe is switched from the contraction length to the extension length, the braided layer elongates in synchronization with the elastic inner pipe. At this time, the angle included between the serrated protrusions gradually increases to approximately 180° to enable the braided layer to stretch.

In some embodiments, the braided wires are made of a wear-resistant material. Thereby, the braided layer has a high wear-resistance.

In some embodiments, the first telescopic pipe body is externally sleeved with at least one second pipe body. Thereby, direct contact of the braided layer with the outside is avoided, so that the service life of the telescopic water pipe can be further increased.

In some embodiments, the second pipe body is an elastic telescopic pipe or a non-elastic pleated pipe. Thereby, the second pipe body can expand and contract together with the first telescopic pipe body.

In some embodiments, the second pipe body is a tubular cloth cover layer or a tubular plastic film layer. Thereby, the first telescopic pipe body is separated from the outside, and the service life of the first telescopic pipe body is extended, thereby increasing the service life of the telescopic water pipe.

In some embodiments, the first telescopic pipe body is externally provided with a waterproof structure or a wear-resistant structure. The waterproof structure allows the surface of the telescopic water pipe to be resistant to dirt, and the wear-resistant structure can increase the wear-resistance of the entire telescopic water pipe, thereby increasing the service life of the telescopic water pipe.

DETAILED DESCRIPTION

The present invention will be further described in detail below with reference to the accompanying drawings.

FIGS. 1 to 6 schematically show a telescopic water pipe according to a first embodiment of the present invention.

Figure 1:
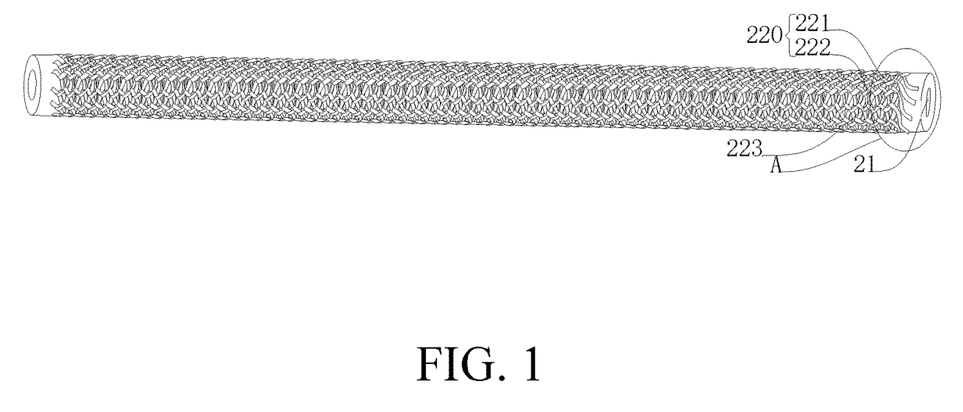
FIG. 1 is a schematic structural view of a telescopic water pipe according to a first embodiment of the present invention.
Figure 2:
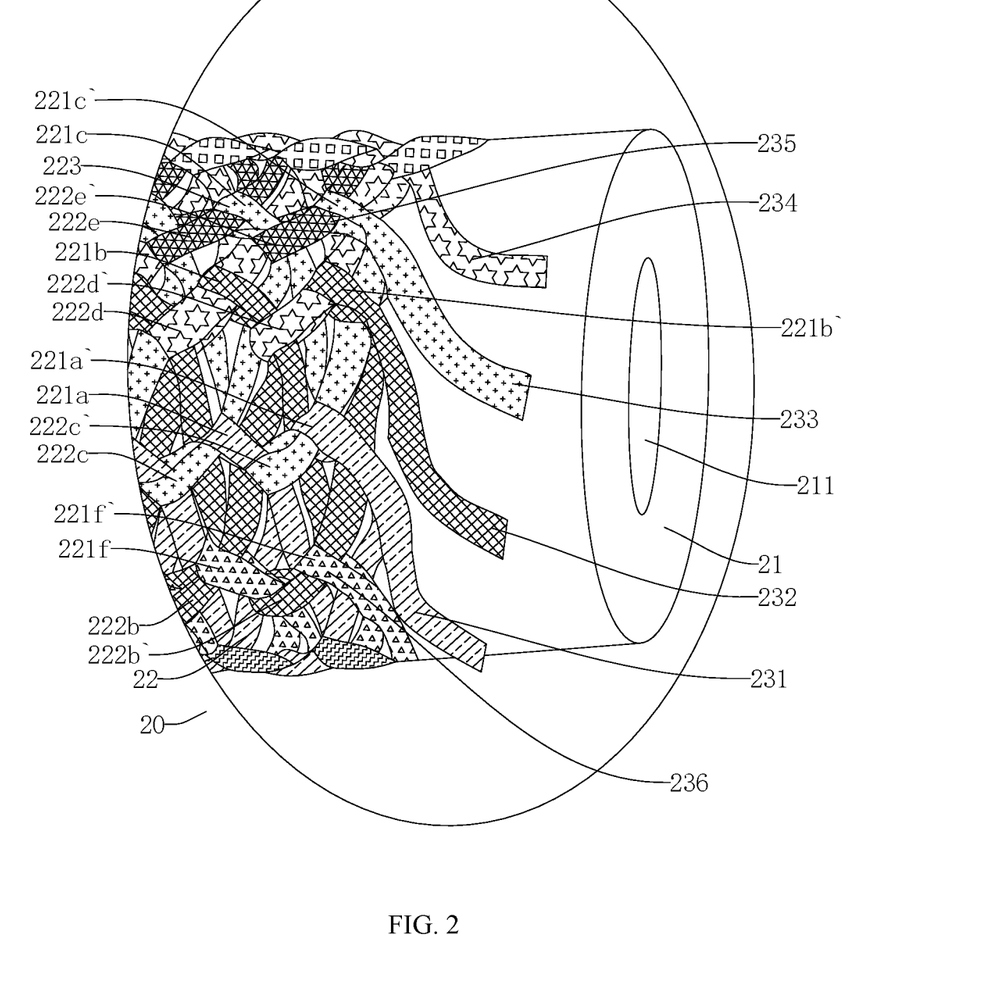
FIG. 2 is a schematic enlarged structural view of a portion A of the telescopic water pipe shown in FIG. 1.

As shown in FIGS. 1 and 2, the telescopic water pipe comprises an elastic inner pipe 21 and a braided layer 22, wherein the elastic inner pipe 21 is a tubular structure, in which a channel 211 for allowing a liquid to pass therethrough is integrally formed or processed, and the elastic inner pipe 21 has a contraction length and an extension length under the action of the pressure of the liquid passing therethrough; wherein the braided layer 22 is wrapped on an outer circumferential surface of the elastic inner pipe 21; wherein the elastic inner pipe 21 and the braided layer 22 wrapped on the outer layer thereof form together a first telescopic pipe body 20, the first telescopic pipe body 20 can expand and contract with the expansion and contraction of the elastic inner pipe 21, that is, the braid layer 22 expands and contracts in synchronization with the elastic inner pipe 21, that is, the braid layer 22 is also expandable and contractible, the outer diameters of the first telescopic pipe body 20 at the contraction length and at the extension length are close to the outer diameters of the elastic inner pipe 21 at the corresponding lengths.

The braided layer 22 disposed on the outer side of the elastic inner pipe 21 can not only prevent the elastic inner pipe 21 from being pierced by sharp objects such as external sandstone, branches, plant thorns during use. Moreover, since the braided layer 22 is tightly fitted to the outer circumferential surface of the elastic inner pipe 21, on the one hand, when the elastic inner pipe 21 is transformed between the contraction length and the extension length under the action of its internal liquid pressure, the braided layer 22 and the elastic inner pipe 21 simultaneously extend or contract under the action of the static friction between the braided layer 22 and the elastic inner pipe 21. Therefore, the elastic inner pipe 21 is not worn by the braided layer 22 which moves relative thereto, thereby prolonging the service life of the first telescopic pipe body 20. Meanwhile, since the outer diameter of the first telescopic tubular body 20 at the extension length approaches the outer diameter of the elastic inner pipe 21 at the extension length, that is, the outer diameter of the braided layer 22 at the extension length approaches the outer diameter of the elastic inner pipe 21 at the extension length, when the elastic inner pipe 21 is at the extension length, the braided layer 22 wrapped around the outside thereof can prevent it from expanding, preventing it from being broken due to the sharp thinning of the wall thickness caused by simultaneous extension and expansion. Moreover, regardless of whether the elastic inner pipe 21 is at the contraction length or the extension length, the braided layer 22 is tightly fitted to the outer circumferential surface of the elastic inner pipe 21, that is, the outer diameters of the first telescopic pipe body 20 at the contraction length and at the extension length are close to the outer diameters of the elastic inner pipe 21 at the corresponding lengths, so that the braided layer 22 does not form pleats on the outer circumference of the elastic inner pipe 21, and the amount of the braided layer 22 is reduced, and the obtained first telescopic pipe body 20 has a small volume, a small occupied space, and a light weight. In addition, since the braided layer 22 is directly woven on the outside of the elastic inner pipe 21 by knitting, the braided layer 22 can be woven outside the elastic inner pipe 21 of any length, and the first telescoping pipe body 20 having an unrestricted length is obtained.

Specifically, with continued reference to FIGS. 1 and 2, the braided layer 22 is woven seamlessly by means of braided wires 220 along the outer circumferential surface of the elastic inner pipe 21, and the braided layer 22 is woven seamlessly on the elastic inner pipe 21. Thereby, the amount of use of the braided wires 220 can be saved.

Figure 3:
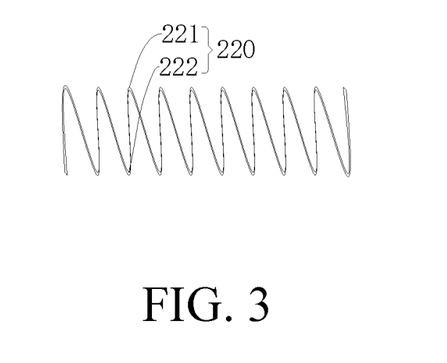
FIG. 3 is a schematic structural view of braided wires of the telescopic water pipe shown in FIG. 1.

A specific embodiment of the braided layer 22 is shown in FIGS. 1 and 2. The braided layer 22 is woven around the outer circumference of the elastic inner pipe 21 by means of where the braided wires 220 include a plurality of braided wire strands (such as first braided wire strand 231, second braided wire strand 232, third braided wire strand 233, fourth braided wire strand 234, fifth braided wire strand 235 and sixth braided wire strand 236, as described below). In order to facilitate the visibility of the weaving direction of each of the braided wires strands, FIG. 2 uses the same pattern for the braided wires 220. As shown in FIG. 3, the braided wires strands run in a wavy trajectory along an axial direction of the elastic inner pipe 21 and each strand forms a first coil 221 at the upper portion of the wavy trajectory and a second coil 222 at the lower portion thereof. A second coil 222 on each of the braided wires strands is nested outside of one of two adjacent ones of the first coil 221 of outer braided wire strands and inside of the other of the two adjacent ones of the first coils 221 of other braided wire strands, respectively, as discussed further below. The two adjacent one of the first coils 221 are coils on the other braided wire strands, and the first coil 221 or the second coil 222 of the braided wire strands on which the two coils are nested with each other extends toward a side where the respective counterpart is located. Similarly, a first coil 221 on each of the braided wires strands is nested outside of one of the adjacent two of the second coils 222 and inside of the other of the two adjacent second coils 222, respectively. The two adjacent ones of the second coils 222 are also coils on the other braided wire strands, and the second coil 222 or the first coil 221 of the braided wire 220 on which the two coils are nested with each other extends also toward a side where the respective counterpart is located. Since each coil on each of the braided wire strands is nested outside of one of the adjacent two coils of the other braided wire strands and inside of the other of the adjacent two coils respectively, when the first telescopic pipe body 20 is stretched, the mutually nested coils are not separated from each other, and the braided layer still maintains a mesh-shaped tubular structure, so that the woven braided layer 22 is not easily loosened. Further, the braided wire strands run in a wavy trajectory along an axial direction of the elastic inner pipe 21, and the first coil 221 and the second coil 222 of the braided wire strands are mutually nested with the coils of the other braided sire strands, so that when the first telescopic tubular body 20 is placed horizontally, When the first telescopic pipe body 20 is horizontally placed, the portion of the same braided wire strands between the mutually nested coils has a "V" shape or an inverted "V" shape, so that the braided layer 22 has a mesh-shape. The first coil 221 includes first coil A 221a and first coil A' 221a' of the first braided wire 231, first coil B 221b of the second braided wire 232, first coil C 221c and first coil C' 221c' of the third braided wire 233, and first coil F 221f of the sixth braided wire 236; the second coil 222 includes second coil B 222b of the second braided wire 232, second coil C 222c and second coil C' 222c' of the third braided wire 233, second coil D 222d and second coil D' 222d' of the fourth braided wire 234, and second coil E 222e and second coil E' 222e' of the fifth braided wire 235.

Preferably, the braided layer 22 is woven around the outer circumference of the elastic inner pipe 21 by means of at least four of the braided wires strands 220. At least one braided wire strand is nested between two mutually nested braided wires strands. Thereby, the mesh formed by the braided wires 220 between the mutually nested coils is denser, and thus the ability of the braided layer 22 to protect the elastic inner pipe 21 is improved.

Preferably, the number of all the braided wires strands spaced apart between the mutually nested two braided wires strands is equal, so that the woven braided layer is uniform, and the mesh on the braid layer is evenly distributed, thereby obtaining a braided layer having an evenly distributed strength.

Further, as shown in FIG. 2, the two mutually nested braided wires strands are mutually nested on the side facing away from the elastic inner pipe 21 of the braided wire strand located therebetween. Specifically, as shown in FIG. 2, the sixth braided wire strand 236, the first braided wire strand 231, the second braided wire strand 232, the third braided wire strand 233, the fourth braided wire strand 234, and the fifth braided wire strand 235 are sequentially arranged on the outer circumference of the elastic inner pipe 21, wherein the first coil 221 of the first braided wire strand 231 and the two adjacent ones of the second coils 222 of the third braided wire strand 233 are nested with each other (i.e. the second coil C' 222 c' is nested outside of the first coil A 221 a, the second coil C 222 c is nested inside of the first coil A 221 a, the first coil A' 221a' of the first braided wire 231 is nested outside of the second coil C' 222c' of the third braided wire 233); there is a gap between the coils mutually nested on the first coil A 221a of the first braided wire 231 and the second coil C' 222c' of the third braided wire 233 and the elastic inner pipe 21, the second braided wire strand 232 passes through the gap, and is nested with the fourth braided wire strand 234 and the sixth braided wire strand 236. Specifically, the first coil 221 of the second braided wire strand 232 and the second coil 222 of the fourth braided wire strand 234 are nested with each other (i.e. the first coil B 221b of the second braided wire 232 is nested inside of the second coil D' 222d' of the fourth braided wire 234, the first coil B 221b of the second braided wire 232 is nested outside of the second coil D 222d of the fourth braided wire 234), and the second coil 222 of the second braided wire strand 232 and the first coil 221 of the sixth braided wire strand 236 are nested with each other (i.e. the second coil B 222b of the second braided wire 232 is nested inside of the first coil F 221f of the sixth braided wire 236); The first coil 221 of the third braided wire strand 233 passes through the gap between the coils mutually nested on the second braided wire strand 232 and the fourth braided wire strand 234 and the elastic inner pipe 21, and is nested with the second coil 222 of the fifth braided wire strand 235 (i.e. the second coil E' 222e' of the fifth braided wire 235 is nested outside of the first coil C 221c of the third braided wire 233, and the second coil E' 222e' of the fifth braided wire 235 is nested inside of the first coil C' 221c' of the third braided wire 233, the first coil C 221c of the third braided wire 233 is nested outside of the second coil E 222e of the fifth braided wire 235). All the braided wire strands distributed on the outer circumference of the elastic inner pipe 21 are woven into a tubular braided layer 22 outside the elastic inner pipe 21 in the above-described weaving manner to closely fit on the outer circumference of the elastic inner pipe 21. Since the mutually nested coils can be placed on the braided wire 220 between the two braided wires strands to which the two coils belong, the effect of the protrusions 223 formed by the mutually nested coils on the braided layer 22 on the elastic inner pipe 21 is reduced, the inner surface of the braided layer 22 is maintained in a relatively flat state, and the friction between the braided layer 22 and the elastic inner pipe 21 is reduced.

Figure 4:
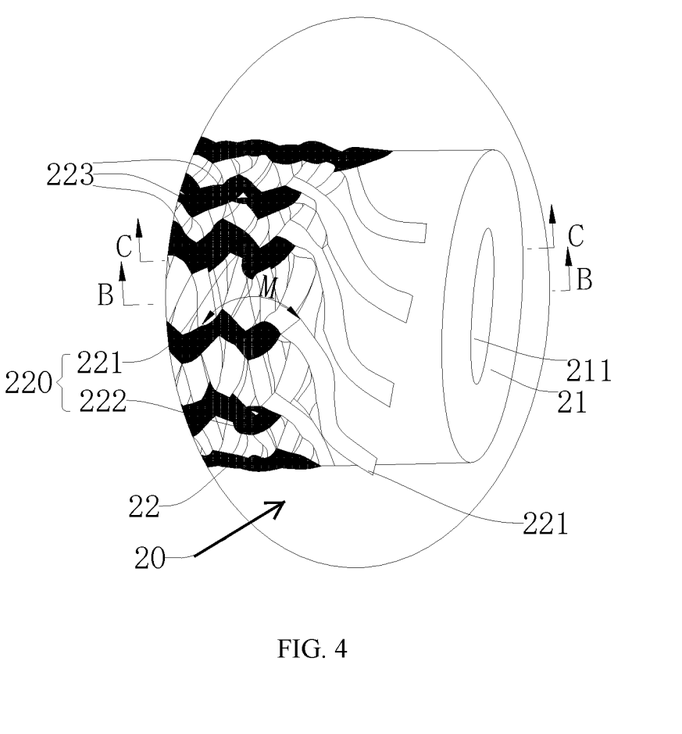
FIG. 4 is a schematic structural view of protrusions of the telescopic water pipe shown in FIG. 2.
Figure 5:
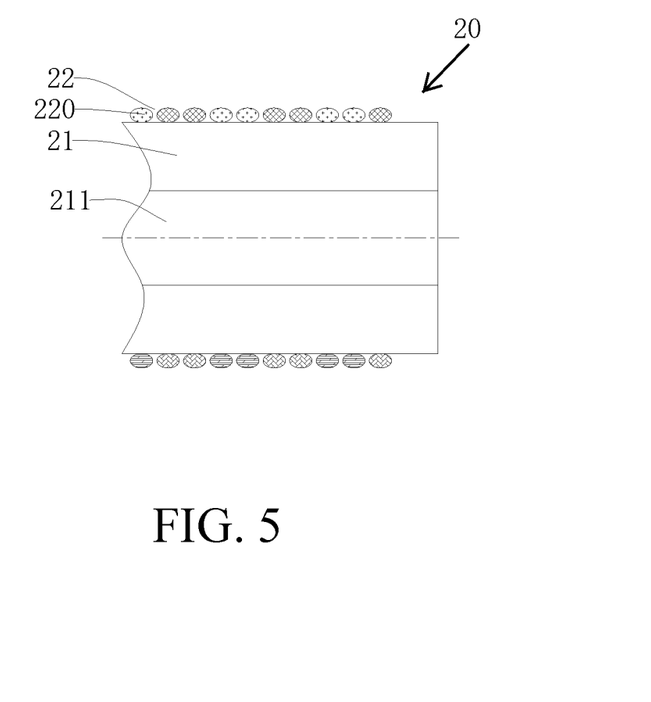
FIG. 5 is a schematic structural view of the telescopic water pipe shown in FIG. 4 taken along a section B-B.
Figure 6:
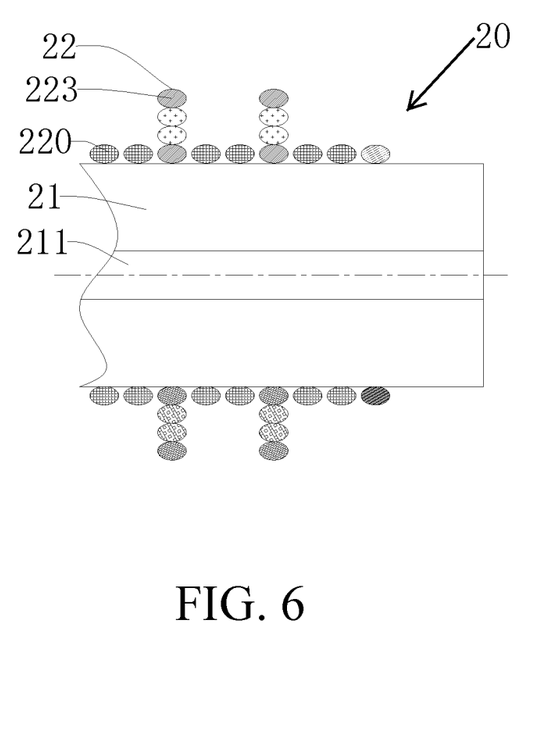
FIG. 6 is a schematic structural view of the telescopic water pipe shown in FIG. 4 taken along a section C-C.

Preferably, as shown in FIGS. 1, 2 and 4, the mutually nested coils of the two braided wires strands form protrusions 223 on the outer circumference of the braided layer 22, wherein the protrusions 223 extend in the axial direction of the elastic inner pipe 21 and the serrated protrusions 223 are formed (i.e. the mutually nested the second coil E 222e of the fifth braided wire 235 and the first coil C 221c of the third braided wire 233 form protrusions 223 on the outer circumference of the braided layer 22, the protrusions 223 extending in the axial direction of the elastic inner pipe 21). When the two coils are nested with each other, the thickness of the portion of the mutually nested coils on the braided layer 22 corresponds to the thickness of the four-layer configuration of braided wire 220 strands (as shown in FIGS. 4 and 6), while the thickness of the portion of the braided layer 22 between the mutually nested coils has only the thickness of the one-layer of braided wire 220 (as shown in FIGS. 4 to 6). Therefore, it is equivalent to forming the protrusions 223 at the portion of the braided layer 22 at which the mutually nested coils are located. The protrusions 223 can on the one hand increase the distance in which the elastic inner pipe 21 is in direct contact with the outside and reduce the probability of the elastic inner pipe 21 being pierced by the outside, and on the other hand increase the service life of the braided layer 22, thereby improving the overall service life of the telescopic water pipe.

Specifically, as shown in FIG. 4, the tooth tips of the serrated protrusions 223 extend toward the circumferential direction of the braided layer 22. In order to facilitate the visibility of the shape of the protrusions 223, the protrusions 223 are shown as a dark portion in FIG. 4. Since the protrusions 223 are formed by nesting mutually the two coils, when the elastic inner pipe 21 is at the contraction length, the angle M included between the serrated protrusions 223 (the angle included between the two serrated tooth faces) has its minimum value. When the elastic inner pipe 21 is switched from the contraction length to the extension length, the braided layer 22 elongates in synchronization with the elastic inner pipe 21. Further, the angle M included between the serrated protrusions 223 gradually increases to the maximum value, and the angle M ranges from 0° to 180° to enable the braided layer 22 to stretch. Similarly, as shown in FIGS. 2 and 4, the angle included between the "V"-shaped or inverted "V"-shaped portions between the coils of the same braided wire strands mutually nested with those of the other braided wires strands ranges also from 0° to 180°. Moreover, when the elastic inner pipe 21 is at the contraction length, the angle included between the "V"-shaped or inverted "V"-shaped portions has its minimum value. When the elastic inner pipe 21 is switched from the contracted length to the extension length, the braided layer 22 elongates in synchronization with the elastic inner pipe 21. At this time, the angle included between the "V"-shaped or inverted "V"-shaped portions gradually increases to the maximum value to enable the braided layer 22 to stretch.

Preferably, the braided wires 220 are made of a wear-resistant material. For example, they may be made of nylon or polypropylene fiber or polyamide fiber. They may also be made of polypropylene, acrylic fiber, polyester fiber or polyacrylonitrile. Other spun yarns or yarns with good wear-resistance can also be used. Thus, the braided layer 22 has a high wear-resistance.

The elastic inner pipe 21 may be made of any one of TPE (thermoplastic elastomer), TPR (thermoplastic rubber) or TPU (thermoplastic polyurethane elastomer rubber). It may also be made of other materials such as PVC (polyvinyl chloride), PP (polypropylene), PE (polyethylene), PS (polystyrene), PU (polyurethane), EVA (ethylene-vinyl acetate copolymer), TPV (thermoplastic vulcanized rubber) or ABS (acrylonitrile-butadiene-styrene) and other materials, as long as the obtained elastic inner pipe 21 can have a contraction length and an extension length under the action of the pressure of the liquid passing therethrough, that is, the elastic inner pipe 21 can expand and contract (having an elastic force) under the action of the pressure of the liquid passing therethrough. The specific material of the elastic inner pipe 21 is not limited in the present invention.

Figure 7:
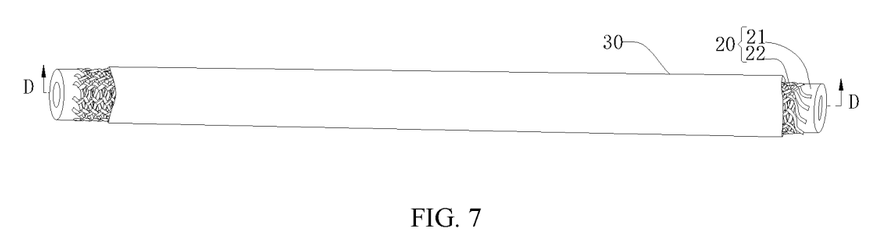
FIG. 7 is a schematic structural view of a telescopic water pipe according to a second embodiment of the present invention.
Figure 8:
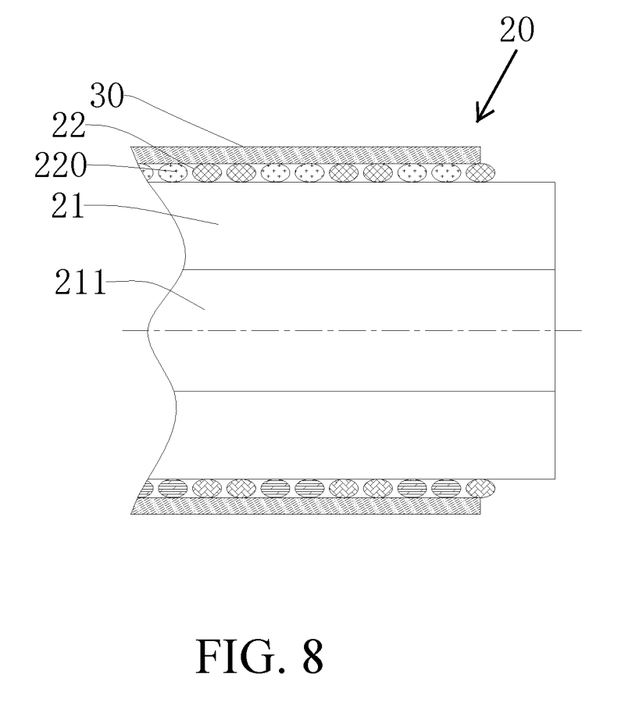
FIG. 8 is a schematic partial structural view of the telescopic water pipe of FIG. 7 taken along a section D-D.

FIGS. 7 and 8 schematically show a telescopic water pipe according to a second embodiment of the present invention.

As shown in FIGS. 7 and 8, the telescopic water pipe of the present embodiment is different from the telescopic water pipe of the first embodiment only in that at least one second pipe body 30 is sleeved outside the first telescopic pipe body 20 to prevent the braided layer 22 from directly contacting the outside. Thereby, the service life of the telescopic water pipe can be further increased.

In the present embodiment, as will be further described with reference to FIGS. 7 and 8, the second pipe body 30 can expand and contract in the axial direction of the telescopic elastic inner pipe 21, that is, the second pipe body 30 is a telescopic elastic pipe. Preferably, the second pipe body 30 is integrally formed on the outside of the first telescopic pipe body 20 to produce a telescopic water pipe of unrestricted length.

Specifically, the second pipe body 30 may be made of the same material as the elastic inner pipe 21, or may adopt a braided cloth sleeve having elasticity, as long as the second pipe body 30 has elasticity and can expand and contract. The specific material of the second pipe body 30 is not limited in the present invention. Preferably, as shown in FIG. 8, the inner wall of the second pipe body 30 is tightly attached to the outer wall of the braided layer 22. Thus, on the one hand, the volume and weight of the telescopic water pipe are not significantly increased, so that the telescopic water pipe maintains the advantages of light weight and small volume, and on the other hand, under the action of the static friction between the second pipe body 30 and the braided layer 22, the second pipe body 30 can expand or contract in synchronization with the first telescopic pipe body 20.

Figure 9:
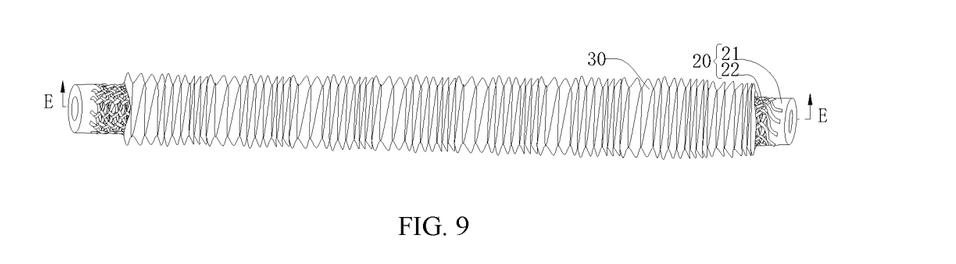
FIG. 9 is a schematic structural view of a telescopic water pipe according to a third embodiment of the present invention.
Figure 10:
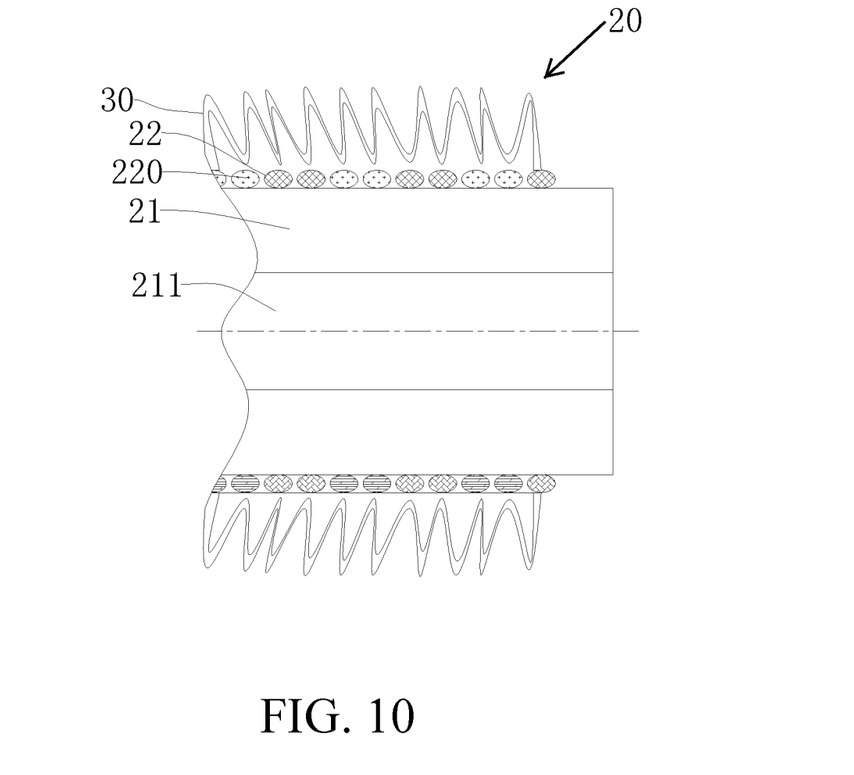
FIG. 10 is a schematic partial structural view of the telescopic water pipe shown in FIG. 9 taken along a section E-E.

FIGS. 9 and 10 schematically show a telescopic water pipe according to a third embodiment of the present invention.

As shown in FIGS. 9 and 10, the telescopic water pipe in this embodiment differs from the telescopic water pipe of the second embodiment only in that the second pipe body 30 does not have elasticity, and it forms pleats on the outer side of the first telescopic pipe body 20, that is, the second pipe body 30 is longer than the first telescopic pipe body 20. When the first telescopic pipe body 20 extends, the second pipe body 30 can deploy, so that the pleats formed by the second pipe body 30 on the outer side of the first telescopic pipe body 20 tend to be flat, thereby enabling the second pipe body 30 to expand and contract together with the first telescopic pipe body 20.

In the present embodiment, the second pipe body 30 may be a tubular cloth cover layer or a tubular plastic film layer.

When the second pipe body 30 is made of a wear-resistant cloth sleeve, the wear-resistant cloth sleeve can be made of one or more of materials such as nylon, polypropylene fiber, polyamide fiber, polypropylene, acrylic fiber, polyester fiber, polyacrylonitrile and the like. It can also be made of a mixture of the above materials and glass fiber and/or metal fiber. Thereby, the second pipe body 30 has better wear-resistance. The cloth sleeve used in the second pipe body 30 can also be woven by other commonly used spun yarns or yarns in the prior art. The material of the cloth sleeve used in the second pipe body 30 is not limited in the present invention.

Figure 11:
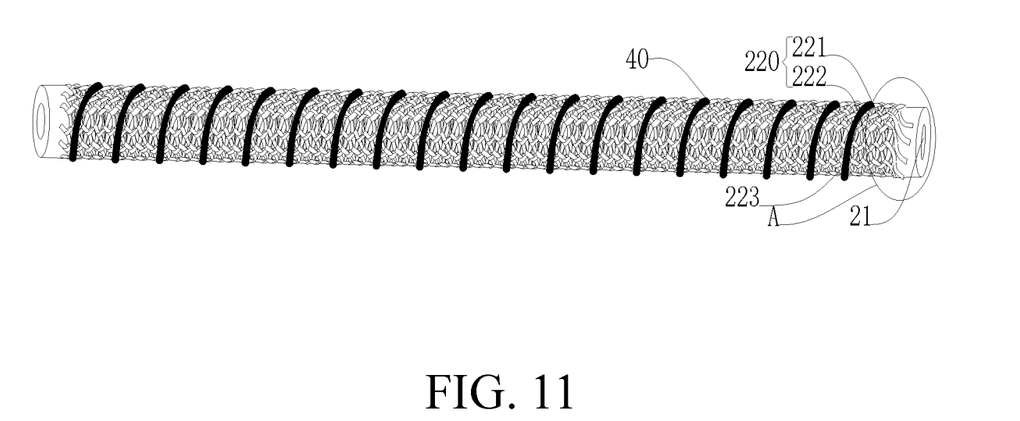
FIG. 11 is a schematic structural view of a telescopic water pipe according to a fourth embodiment of the present invention.

FIG. 11 schematically shows a telescopic water pipe according to a fourth embodiment of the present invention.

In the present embodiment, a waterproof structure or a wear-resistant structure is provided on the outer side of the first telescopic pipe body 20.

When the wear-resistant structure is provided on the outer side of the first telescopic pipe body 20, for example, as shown in FIG. 11, spiral protrusions 40 are wound on the outer circumferential surface of the first telescopic pipe body 20, so that the wear-resistance of the telescopic pipe body can be increased, thereby increasing the service life of the telescopic water pipe. Preferably, the spiral protrusions 40 are made of an elastic material. The wear-resistant structure may also be provided as a plurality of annular protrusions that are sleeved outside the first telescopic pipe body 20, or dot-like protrusions (not shown) that are evenly distributed on the outer peripheral surface of the first telescopic pipe body 20.

When the waterproof structure is provided on the outer side of the first telescopic pipe body 20, the surface of the telescopic water pipe can be made resistant to dirt. The waterproof structure may be, for example, a waterproof layer coated on the outer circumference of the first telescopic pipe body 20. For example, a waterproof coating (not shown) commonly used in the prior art may be coated on the outer peripheral surface of the first telescopic pipe body 20.

What has been described above is only some embodiments of the present invention. It will be apparent to those skilled in the art that various modifications and improvements can be made without departing from the spirit and scope of the invention, and these are included within the scope of the present invention.

What is claimed is:

1. A telescopic water pipe, comprising:
   an elastic inner pipe (21) for allowing a liquid to pass therethrough, the elastic inner pipe (21) having a contraction length and an extension length under the action of the pressure of the liquid passing therethrough; and
   a braided layer (22) wrapped on an outer circumferential surface of the elastic inner pipe (21);
   wherein:
   the elastic inner pipe (21) and the braided layer (22) form together a first telescopic pipe body (20), the first telescopic pipe body (20) expanding and contracting with the expansion and contraction of the elastic inner pipe (21), and outer diameters of the first telescopic pipe body (20) at the contraction length and at the extension length being close to the outer diameters of the elastic inner pipe (21) at the corresponding lengths;

the braided layer (22) is an outer layer used to reduce the friction between the braided layer (22) and the elastic inner tube (21) and prevent the elastic inner tube (21) from being pierced by sharp objects;

the braided layer (22) is woven along the outer circumferential surface of the elastic inner pipe (21) by means of at least two braided wires (220), and is wrapped seamlessly on the outer circumferential surface of the elastic inner pipe (21);

the braided wires (220) run in a wavy trajectory along an axial direction of the elastic inner pipe (21) and form a first coil (221) and a second coil (222) at the upper and lower portions of the wavy trajectory, respectively;

the braided layer (22) is woven along the outer circumferential surface of the elastic inner pipe (21) by means of a sixth braided wire (236), a first braided wire (231), a second braided wire (232), a third braided wire (233), a fourth braided wire (234), and a fifth braided wire (235) are sequentially arranged on the outer circumference of the elastic inner pipe (21);

the first coil (221) includes a first coil A (221a) and a first coil A' (221a) of the first braided wire (231), a first coil B (221b) of the second braided wire (232), a first coil C (221c) and a first coil C' (221c') of the third braided wire (233), and a first coil F (221f) of the sixth braided wire (236);

the second coil (222) includes a second coil B (222b) of the second braided wire (232), a second coil C (222c) and a second coil C' (222c') of the third braided wire (233), a second coil D (222d) and a second coil D' (222d') of the fourth braided wire (234), and a second coil E (222e) and a second coil E' (222e') of the fifth braided wire (235);

the second coil C' (222c') of the third braided wire (233) is nested outside of the first coil A (221a) of the first braided wire (231), and the second coil C (222c) of the third braided wire (233) is nested inside of the first coil A (221a) of the first braided wire (231), the first coil A' (221a') of the first braided wire (231) is nested outside of the second coil C' (222c) of the third braided wire (233);

the second coil E' (222e') of the fifth braided wire (235) is nested outside of the first coil C (221c) of the third braided wire (233), and the second coil E' (222e') of the fifth braided wire (235) is nested inside of the first coil C' (221c') of the third braided wire (233), the first coil C (221c) of the third braided wire (233) is nested outside of the second coil E (222e) of the fifth braided wire (235).

2. The telescopic water pipe according to claim 1, characterized in that the first telescopic pipe body (20) is externally sleeved with at least one second pipe body (30).

3. The telescopic water pipe according to claim 2, characterized in that the second pipe body (30) is an elastic telescopic pipe or a non-elastic pleated pipe.

4. The telescopic water pipe according to claim 3, characterized in that the second pipe body is a tubular cloth cover layer or a tubular plastic film layer.

5. The telescopic water pipe according to claim 1, characterized in that the first telescopic pipe body (20) is externally provided with a waterproof structure or a wear-resistant structure.

6. The telescopic water pipe according to claim 1, characterized in that there is a gap between the coils mutually nested on the first coil A (221a) of the first braided wire (231) and the second coil C' (222c') of the third braided wire (233) and the elastic inner pipe (21), and the second braided wire (232) passes through the gap, and the second coil B (222b) of the second braided wire (232) is nested inside of the first coil F (221f) of the sixth braided wire (236), the first coil B (221b) of the second braided wire (232) is nested inside of the second coil D' (222d') of the fourth braided wire (234), the first coil B (221b) of the second braided wire (232) is nested outside of the second coil D (222d) of the fourth braided wire (234).

7. The telescopic water pipe according to claim 6, characterized in that the mutually nested the second coil E (222e) of the fifth braided wire (235) and the first coil C (221c) of the third braided wire (233) form protrusions (223) on the outer circumference of the braided layer (22), the protrusions (223) extending in the axial direction of the elastic inner pipe (21).

8. The telescopic water pipe according to claim 7, characterized in that the protrusions (223) are formed in a serrated shape, and serrated tooth tips extend in a circumferential direction of the braided layer (22).

9. The telescopic water pipe according to claim 1, characterized in that the braided wires (220) are made of a wear-resistant material.

10. The telescopic water pipe according to claim 6, characterized in that the first telescopic pipe body (20) is externally sleeved with at least one second pipe body (30).

11. The telescopic water pipe according to claim 6, characterized in that the first telescopic pipe body (20) is externally provided with a waterproof structure or a wear-resistant structure.

* * * * *